(12) United States Patent
Ma et al.

(10) Patent No.: US 8,413,453 B2
(45) Date of Patent: Apr. 9, 2013

(54) AUXILIARY CONTROL DEVICE FOR AIR CONDITIONING SYSTEM

(76) Inventors: Ssu-Pin Ma, San Jose, CA (US); Ravi Aripirala, Fremont, CA (US)

( * ) Notice: Subject to any disclaimer, the term of this patent is extended or adjusted under 35 U.S.C. 154(b) by 761 days.

(21) Appl. No.: 12/614,853

(22) Filed: Nov. 9, 2009

(65) Prior Publication Data

US 2011/0112695 A1    May 12, 2011

(51) Int. Cl.
*G05D 23/00* (2006.01)
*F25D 17/00* (2006.01)

(52) U.S. Cl. ............. 62/157; 62/186; 62/231; 236/46 C; 236/49.3

(58) Field of Classification Search .................... 62/157, 62/186, 231; 236/46 C, 49.3; 454/322, 325, 454/333
See application file for complete search history.

(56) References Cited

U.S. PATENT DOCUMENTS

| 5,271,558 | A | 12/1993 | Hampton |
| 5,348,078 | A | 9/1994 | Dushane et al. |
| 5,761,083 | A | 6/1998 | Brown, Jr. et al. |
| 5,927,599 | A | 7/1999 | Kath |
| 2008/0119127 | A1* | 5/2008 | Stewart ..................... 454/256 |

* cited by examiner

*Primary Examiner* — Marc Norman
(74) *Attorney, Agent, or Firm* — Morris Manning & Martin LLP; Tim Tingkang Xia, Esq.

(57) ABSTRACT

An auxiliary control device is adapted to an air conditioning system. The air conditioning system includes a main machine and several vents. The auxiliary control device includes a vent unit and a sub-control unit. The vent unit has valves correspondingly disposed on the vents, and a driver for actuating the valve to adjust an opening size of the vent through the valve. The sub-control unit includes a sub-memory for storing a control time table, a sub-timer for generating the time information, and a sub-controller for controlling the driver to adjust the opening size according to the control time table and the time information. Accordingly, the auxiliary control device is easily adapted to an air conditioning system existing in a user place and controls opening size of the vents in accordance with the control time table previously set by the user.

13 Claims, 19 Drawing Sheets

AUXILIARY CONTROL DEVICE FOR AIR CONDITIONING SYSTEM

FIELD OF INVENTION

The present invention relates to an auxiliary control device, and more particularly, to an auxiliary control device for an air conditioning system.

BACKGROUND

Some buildings, such as houses or offices, are usually disposed with central air conditioning systems. The central air conditioning system includes a central main machine and a plurality of vents (or called as outlets or inlets) for distribution of hot or cold air. The vents are installed in many different rooms. The vents are connected with the central main machine through vent pipes (or called as ducts). The central main machine generates hot air flows or cold air flows. The hot air flows or the cold air flows are delivered to many different rooms through the vent pipes. Therefore, the central air conditioning system may enable air to ventilate in the building and regulate the temperature inside the building and individual rooms in the building.

A damper is usually disposed in each vent to adjust a ventilation amount. However, the damper needs manual operation. A user operating the damper is unable to operate every damper frequently. When the user leaves a room but does not turn off the damper, the hot air flows or the cold air flows generated by the central main machine will be delivered to some rooms without people in, thus causing energy wastage.

In addition, as the dampers are all adjusted in a manual manner, the central main machine is not capable of controlling the required amount of cold/hot air flow by taking into account the current damper settings. Therefore, the central main machine will cause either insufficient or excessive air flow leading to inefficiency. There is a growing need to improve the efficiency of HVAC (heating, ventilating, and air conditioning) systems to combat carbon emissions and a trend towards smart buildings. The central air conditioning system also has to have some automatic control functions. The central air conditioning system having automatic control functions may adjust the ventilation of the hot air flow or the cold air flow automatically, thereby achieving an energy-saving effect. Patents having proposed related conceptions includes U.S. Pat. No. 5,271,558 U.S. Pat. No. 5,348,078, U.S. Pat. No. 5,927,599, and U.S. Pat. No. 5,761,083.

SUMMARY OF THE INVENTION

In view of the problems above, the present invention is an auxiliary control device for an air conditioning system, so as to solve problems in the prior art.

The auxiliary control device is adapted to an air conditioning system. In the single embodiment or in some embodiments, the air conditioning system comprises a main machine and at least one vent (or called as outlet or inlet). The auxiliary control device comprises a vent unit and a sub-control unit. The vent unit comprises a valve and a driver. The valve is correspondingly disposed on the vent. The driver is used for driving the valve to adjust an opening size of the vent.

In the single embodiment or in some embodiments, the sub-control unit comprises a sub-memory, a sub-timer and a sub-controller. The sub-memory is used for storing a control time table. The sub-timer is used for generating time information. The sub-controller controls the driver to adjust the opening size according to the control time table and the time information.

In an embodiment of the present invention, the control time table comprises a plurality of time slots and a plurality of opening sizes corresponding to the time slots. The sub-controller looks up the time slot corresponding to the time information in the control time table, and adjusts the valve with the opening size corresponding to the consulted time slot.

In another embodiment of the present invention, the auxiliary control device further comprises a temperature sensor for sensing a room temperature. The control time table comprises a plurality of time slots and a plurality of temperature setting values corresponding to the time slots. The sub-controller looks up the temperature setting value corresponding to the time information in the control time table with the time information, and adjusts the valve according to the temperature set value and the sensing temperature.

In the single embodiment or in some embodiments, the auxiliary control device further comprises a control panel coupled to the sub-controller. The control panel has an input element for enabling a user to input a control time table. The sub-controller stores the input control time table in the sub-memory.

According to another embodiment of the present invention, the sub-memory of auxiliary control device comprises a mode flag. The mode flag is used to select between a scheduled mode and a compulsory mode by the control panel. The sub-control unit controls the driver to adjust the opening size according to the control time table and the time information when the mode flag is the scheduled mode. The sub-control unit controls the driver to adjust the opening size according to input signals from the control panel when the mode flag is at the compulsory mode.

In an embodiment of the present invention, the air conditioning system further comprises a main control unit. The auxiliary control device comprises a main memory, a main timer, and a main controller. The main timer is used for generating an alternate time slot table. The main controller is coupled to the sub-controller and collects the control time table of the sub-memory with the sub-controller. The main controller integrates the control time table into a general time table, and stores the general time table in the main memory. The main controller outputs a control signal to the main machine according to the alternate time information and the general time table.

In the single embodiment or in some embodiments, as a connection type between the auxiliary control device and other devices may be a wireless communication type, the complexity of installment is reduced, thus saving the cost of installment.

The illustrations above on contents of the present invention and illustrations on the following detailed description are used to exemplify and explain the spirit and principle of the present invention, and provide further explanations for the claims of the present invention.

BRIEF DESCRIPTION OF THE DRAWINGS

The main idea of the present invention can be readily understood by considering the following detailed description in conjunction with accompanying drawing, in which.

DETAILED DESCRIPTION

Specific features and advantages of the present invention are discussed in detail in the following detailed description, the contents of which may enable anyone skilled in the art to understand and implement the technical contents of the present invention. Also, in accordance with the contents, claims, and drawings disclosed in the specification, anyone skilled in the art may readily understand related objectives and advantages of the present invention. The following embodiments are just intended to further illustrate the views of the present invention in detail, but not to limit the scope of the present invention with any views.

Figure 1:
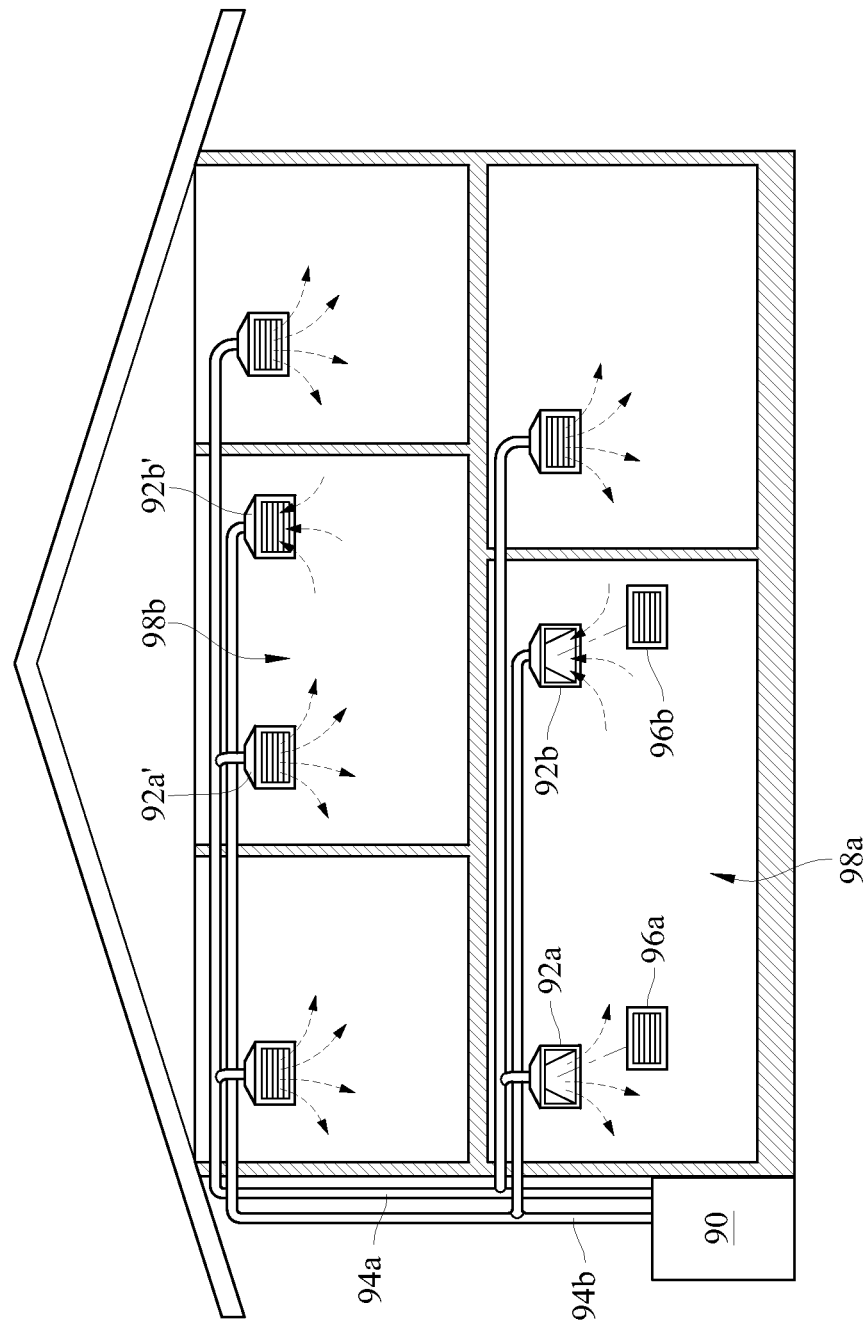
FIG. 1 illustrates a schematic illustration of a house disposed with an air conditioning system according to an embodiment of the present invention.

FIG. 1 illustrates a schematic illustration of a house disposed with an air conditioning system and an auxiliary control device for use in the air conditioning system. The air conditioning system comprises a main machine 90, and a plurality of vents 92a, 92a', 92b, and 92b'. The vents 92a, 92a', 92b, 92b' may be outlet or inlet. When two vents 92a, 92b are in a room 98a, one 92a may be an outlet, and the other one 92b may be an inlet. In the other room 98b, vent 92a' is an outlet. The main machine 90 is connected to the vent 92a and 92a' through outlet duct 94a, and to the vent 92b through inlet duct 94b.

In the single embodiment or in some embodiments, if there are inlet and outlet vent in one room or one area of the house, the both vents will be opened or closed at the same time.

As shown in the figure, the vents 92a, 92b are disposed with the auxiliary control devices 96a, 96b, respectively. The auxiliary control devices 96a and 96b could control the air flow of vents 92a and 92b.

Figure 2:
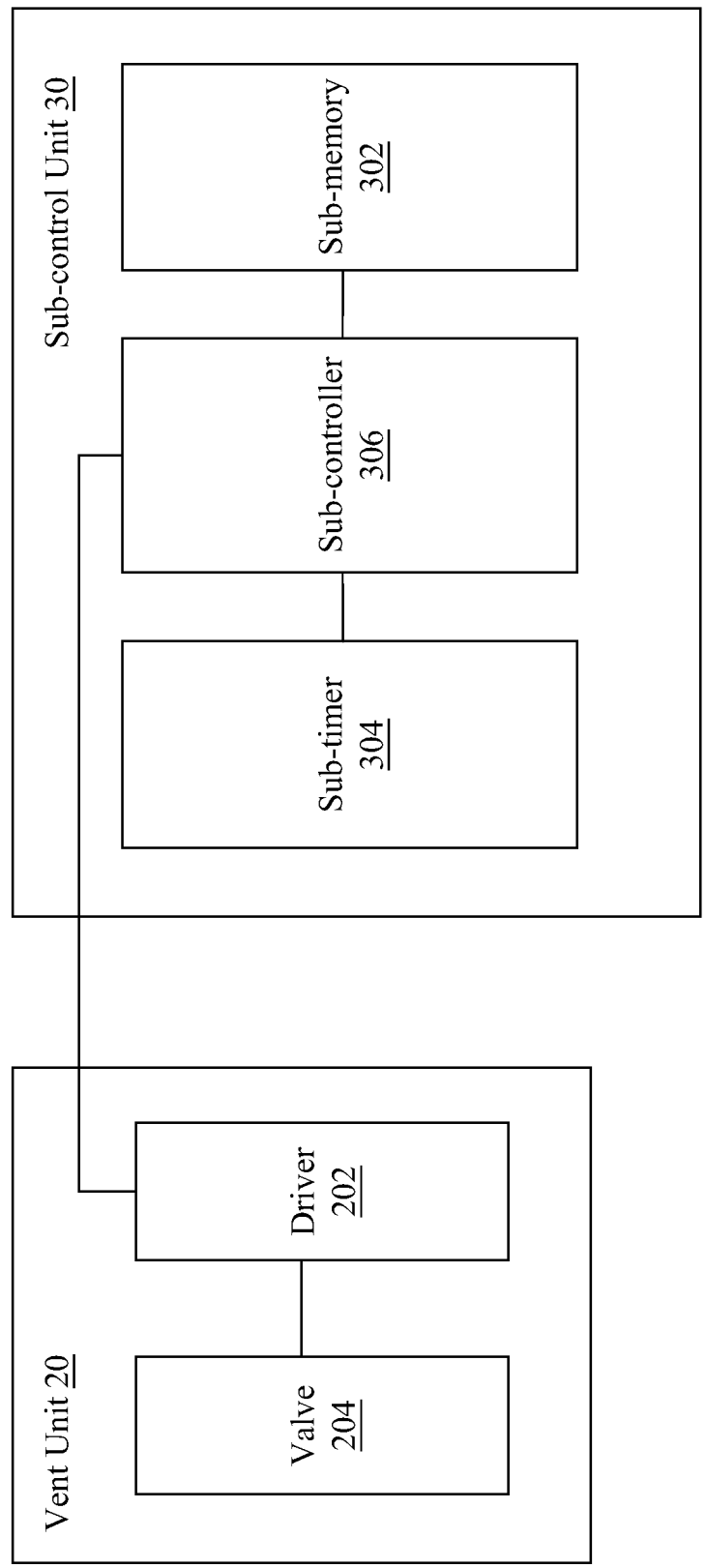
FIG. 2 illustrates a block diagram of a system according to a first embodiment of the present invention.

FIG. 2 illustrates a block diagram of a system according to an embodiment of the present invention. The auxiliary control device 96a, 96b comprises a vent unit 20 and a sub-control unit 30. The sub-control unit 30 may be integrated in the vent unit 20. Alternatively, the sub-control unit 30 and the vent unit 20 may also be disposed separately. The sub-control unit 30 and the vent unit 20 may be connected in a wired manner. The vent unit 20 comprises a driver 202 and a valve 204. The sub-control unit 30 comprises a sub-memory 302, a sub-timer 304, and a sub-controller 306.

The vent unit 20 is correspondingly disposed on the vent, for example, 92a, 92b in FIG. 1. The valve 204 is used for adjusting an opening size of the vent. Therefore, the size of the valve 204 needs to be able to correspond to the vent. The driver 202 drives the valve 204 to adjust the opening size of the vent with the valve 204.

The driver 202 may be a motor, or other elements that may convert electric energy into kinetic energy. The driver 202 may drive the valve 204 through a connecting rod or a gear to adjust the opening size of the vent, which will be discussed in detail below.

The sub-memory 302 is used for storing a control time table. The sub-memory may be a non-volatile memory or volatile memory, such as flash memory, solid state disc or random access memory. The control time table comprises a plurality of time slot and a plurality of opening sizes corresponding to the time slots. Units for the plurality of time slots are second, minute, hour, week, day, month, or year, or a combination thereof. The user may set an opening size (e.g. big, middle, small opening or closed) for each damper, respectively, according to a requirement of each room on the air-conditioning. Taking a bedroom as an example, a damper may be closed between 09:00 and 18:00, middle opening between 18:00 and 20:00, big opening between 20:00 and 24:00, and small opening between 24:00 and 09:00. Of course, the setting may also utilize week or year as a unit for recording. Although the opening size thereof only has four stages of big, middle, small, and close, the present invention is not limited thereto, and it is possible that the number of stages is greater or less than four. In the single embodiment or in some embodiments, the opening size can be only two alternatives, opened or closed in control panel. In the single embodiment or in some embodiments, the opening size may also be replaced by a specific outlet vent size.

The sub-timer 304 is used for generating time information. The time information may represent the current time. The sub-controller 30 look up a time slot corresponding to the time information in the control time table, and adjusts the valve with the opening size corresponding to the consulted time slot. When the opening size corresponding to the current time slot is different from the opening size corresponding to a time slot of a previous unit, the sub-controller 306 transmits a control signal to the driver 202, thereby enlarging an opening of the valve 204 or shrinking the opening of the valve 204. The sub-controller 306 may be a single-chip controller or an embedded system or another computing module having an output/input interface.

Figure 3A:
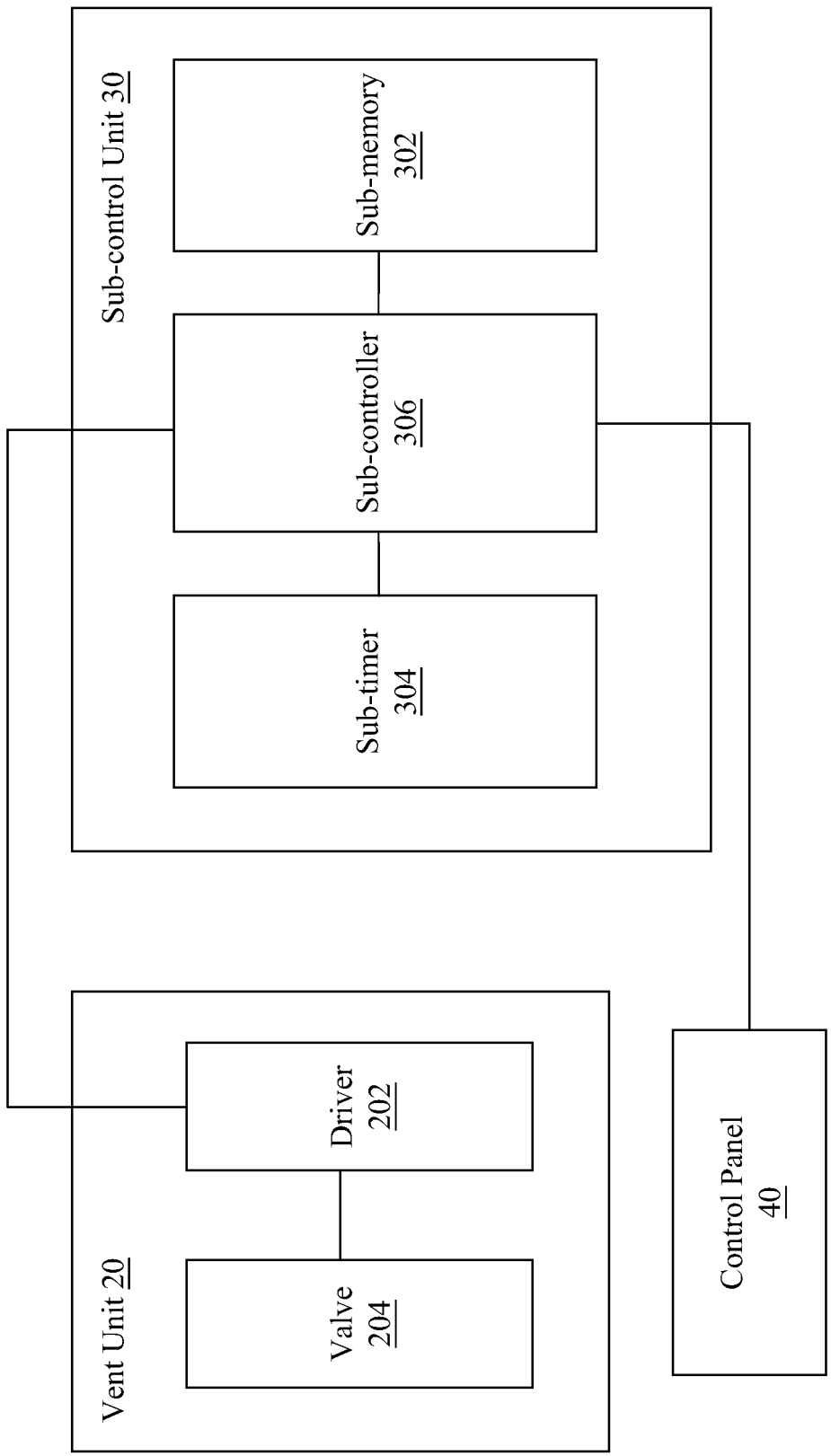
FIGS. 3A and 3B illustrate block diagrams of a system according to a second embodiment of the present invention.
Figure 3B:
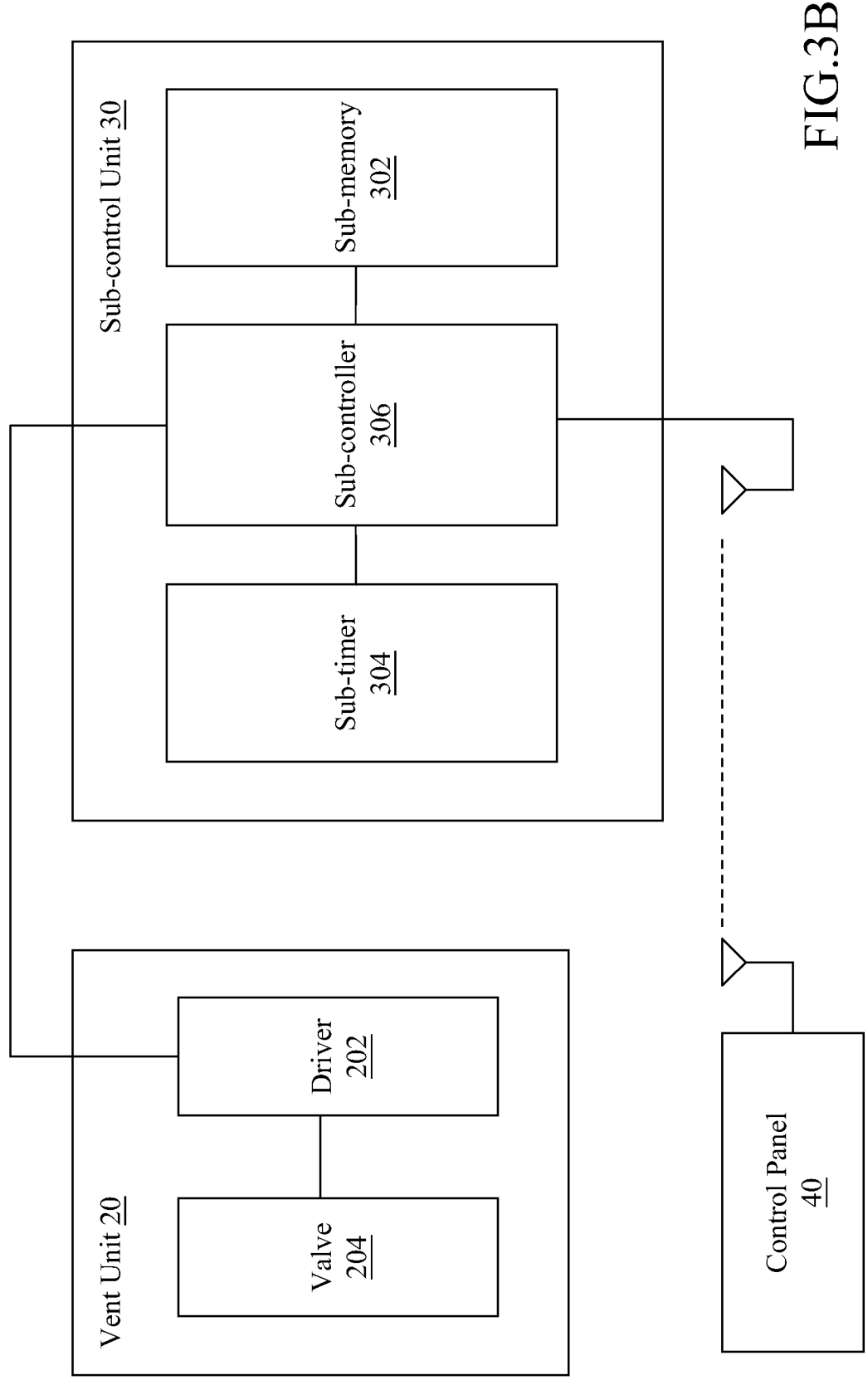

FIG. 3A and FIG. 3B illustrate block diagrams of a system according to a second embodiment of the present invention. The embodiment may facilitate a user to input a control time table for scheduling control or to modify an input time table. The auxiliary control device in this embodiment may comprise a control panel 40. The control panel 40 comprises input elements for a user to input or modify the control time table stored in the sub-memory 302. The control panel 40 is coupled to the sub-controller 306. The sub-controller 306 stores the inputted control time table in the sub-memory 302. The control panel 40 may be integrated with the sub-control unit 30, or the control panel 40 and the sub-control unit 30 may also be two separate units. When the control panel 40 and the sub-control unit 30 are two separate units, the control panel 40 and the sub-controller 306 may be connected through a wired line, referring to FIG. 3A, or wireless means, referring to FIG. 3B. The wireless means may be an infrared, Blue-tooth, Radio Frequency control, ultra sound, or other wireless technologies.

A control panel 40 may be associated with at least one sub-control unit 30. In the single embodiment or in some embodiments, the user can control a plurality of sub-control units 30 by a control panel. If the control panel 40 provides a wireless means, the control panel 40 may control sub-control units 30 within the transmission range of the wireless means. If the wireless means is an infrared, the communication between the transmitter and the receiver may be in line-of-sight or in the distance with enough scattering. In the single embodiment or in some embodiments, the sub-control unit 30 may have an identification code. The control panel with wireless means may control the specific sub-control unit 30 with the corresponding identification code.

In the single embodiment or in some embodiments, the control panel 40 may be a personal computer, such that the user inputs a control time table in the personal computer. The personal computer may transmit the information in the control time table to the sub-controller 36 via internet protocol through a wireless network or a wired network. The sub-controller 36 then stores the control time table in the sub-memory 302. The control panel 40 may also be, but not limited to, a liquid crystal display module. The control panel 40 also may have an input interface for a user to input the control time table.

Figure 4:
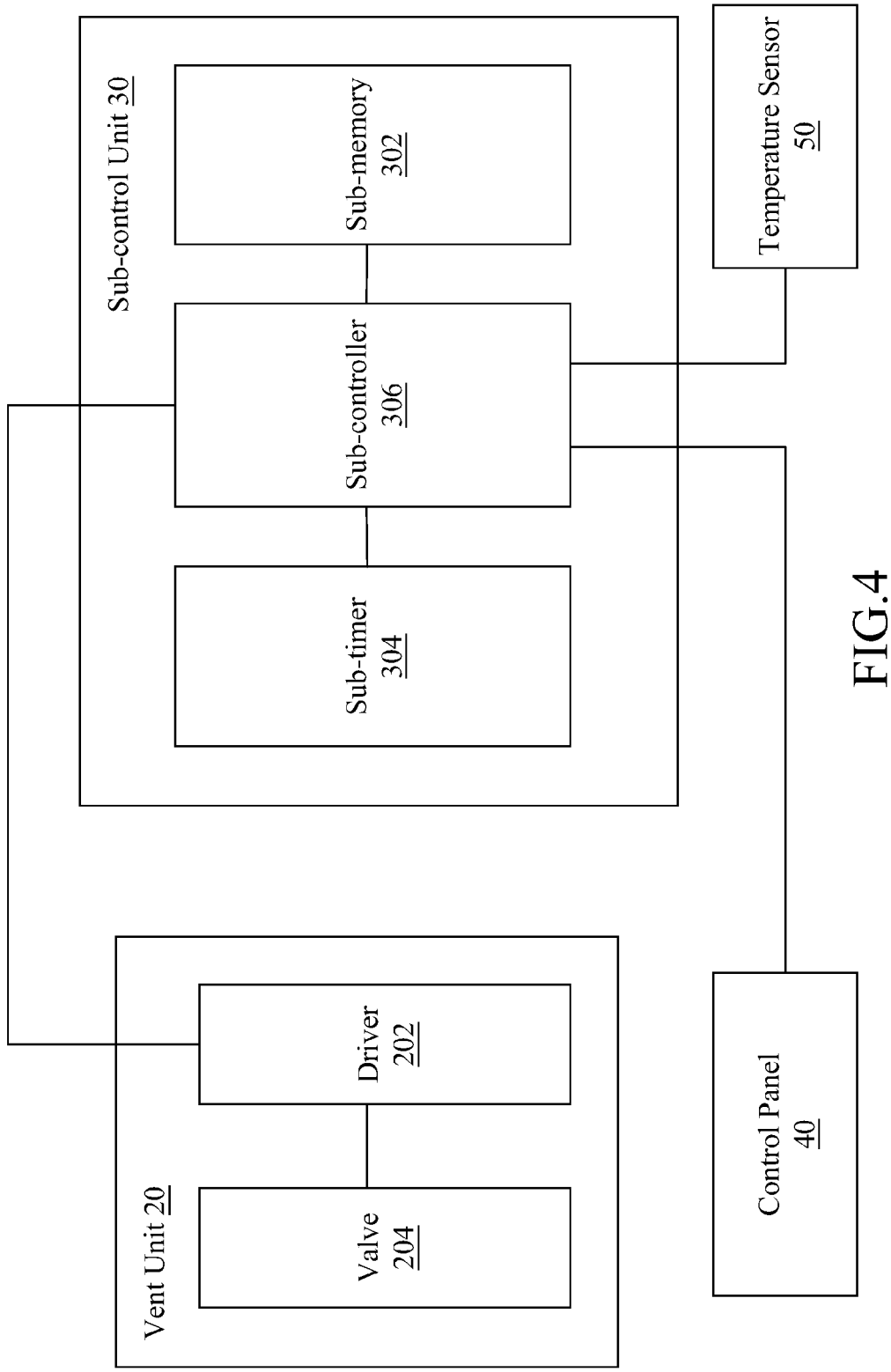
FIG. 4 illustrates a block diagram of a system according to a third embodiment of the present invention.

Referring to FIG. 4, in a third embodiment of the present invention, the auxiliary control device in this embodiment comprises a temperature sensor 50. The temperature sensor 50 is coupled to the sub-controller 306. The temperature sensor 50 may be disposed at any position in a room, for example, be correspondingly disposed at the vent unit 20, or disposed at the control panel 40. A temperature sensed by the temperature sensor 50 may be built in the control panel 40, that is, the temperature sensed by the temperature sensor 50 is displayed on the control panel 40. In this embodiment, the control time table may be adjusted to comprise a plurality of time slots and a plurality of temperature setting values corresponding to the time slots. The sub-controller 306 transfers a control signal to a driver 202 to change an opening size according to the difference between a temperature sensed by the temperature sensor 50 and a temperature set value corresponding to the current time information. For example, when an air flow in the duct is cold air, and if the temperature sensed by the sensor 50 is higher than a temperature setting value of the time slot in the control time table, the sub-controller 306 transmits the control signal to the driver 202 to enable the valve 204 to enlarge the opening size. If the temperature sensed by the sensor 50 is lower than the temperature set value of the time period, the sub-controller 306 transmits the control signal to the driver 202 to enable the valve 204 to shrink the opening size.

The operation mode depicted above is a scheduled mode. In order to provide a more convenient and smarter function of the auxiliary control device, the present invention discloses another embodiment having a compulsory mode. According to the other embodiment of the present invention, the sub-memory 302 of auxiliary control device further comprises a mode flag. The mode flag is selectively set to be the scheduled mode and a compulsory mode by the control panel 40. The sub-control unit 30 controls the driver to adjust the opening size according to the control time table and the time information when the mode flag is the scheduled mode. The sub-control unit 30 controls the driver to adjust the opening size according to input signals from the control panel 40 when the mode flag is the compulsory mode.

As described above, the auxiliary control device may have two operation modes. Normally, the auxiliary control device works in the scheduled mode. There may be at least two methods to change the scheduled mode to the compulsory mode.

The first possible method is to press a mode-change key on the control panel 40. Then, the control panel 40 sends a mode-change signal to the coupled sub-controller 306 (sub-control unit 30). After receiving the mode-change signal, the sub-controller 306 switches the mode flag between the scheduled mode and the compulsory mode.

The second possible method is to press temperature-control key or opening-size control key on the control panel 40. When a user presses the temperature control or opening-size control key on the control panel 40, the control panel 40 transmits the mode-change signal to the coupled sub-controller 306. After receiving the mode-change signal, the sub-controller 306 switches the mode flag between the scheduled mode and the compulsory mode. Additionally, the temperature-control key or the opening-control key may be changed to "Feel Cold" or "Feel Hot" key for fuzzy control concept.

After the mode flag is switched to compulsory mode, the sub-controller 306 may control the driver 202 and valve 204 according to input signals from the control panel 40. The input signals may be a desired temperature, a temperature raising command, a temperature lowering command, a feel cold command, a feel hot command, an opening enlarging command or an opening reducing command.

As for switching from the compulsory mode to the scheduled mode, it can be done by the mode-change signal. Besides, the present invention discloses the other possible methods to intelligently switch back to the scheduled mode. One is to set a predetermined period of time by the user. The other one is to intelligently switch back to the scheduled mode. Concerning the former one, the sub-memory may further comprise a memory block allocated for storing the lasting time period of the compulsory mode which can be set by user. The lasting time period may be a default period of time set by factory. Regarding the latter one, the sub-controller 306 may automatically switch from the compulsory mode to the scheduled mode in accordance with a next changing time in control time table stored in the sub-memory 302. For example, the following is an exemplary control time table in the sub-memory 302. The changing time is 09:00, 18:00, 20:00 and 24:00. If the user sets the auxiliary control device to the compulsory mode around 20:30, the sub-controller 306 changes the operation mode back to the scheduled mode at 24:00 and controls the driver 202 to have the small opening of valve 204.

| Period of Time | Opening of Valve |
| --- | --- |
| 09:00-18:00 | Closed |
| 18:00-20:00 | Medium |
| 20:00-24:00 | Large |
| 24:00-09:00 | Small |

Figure 5:
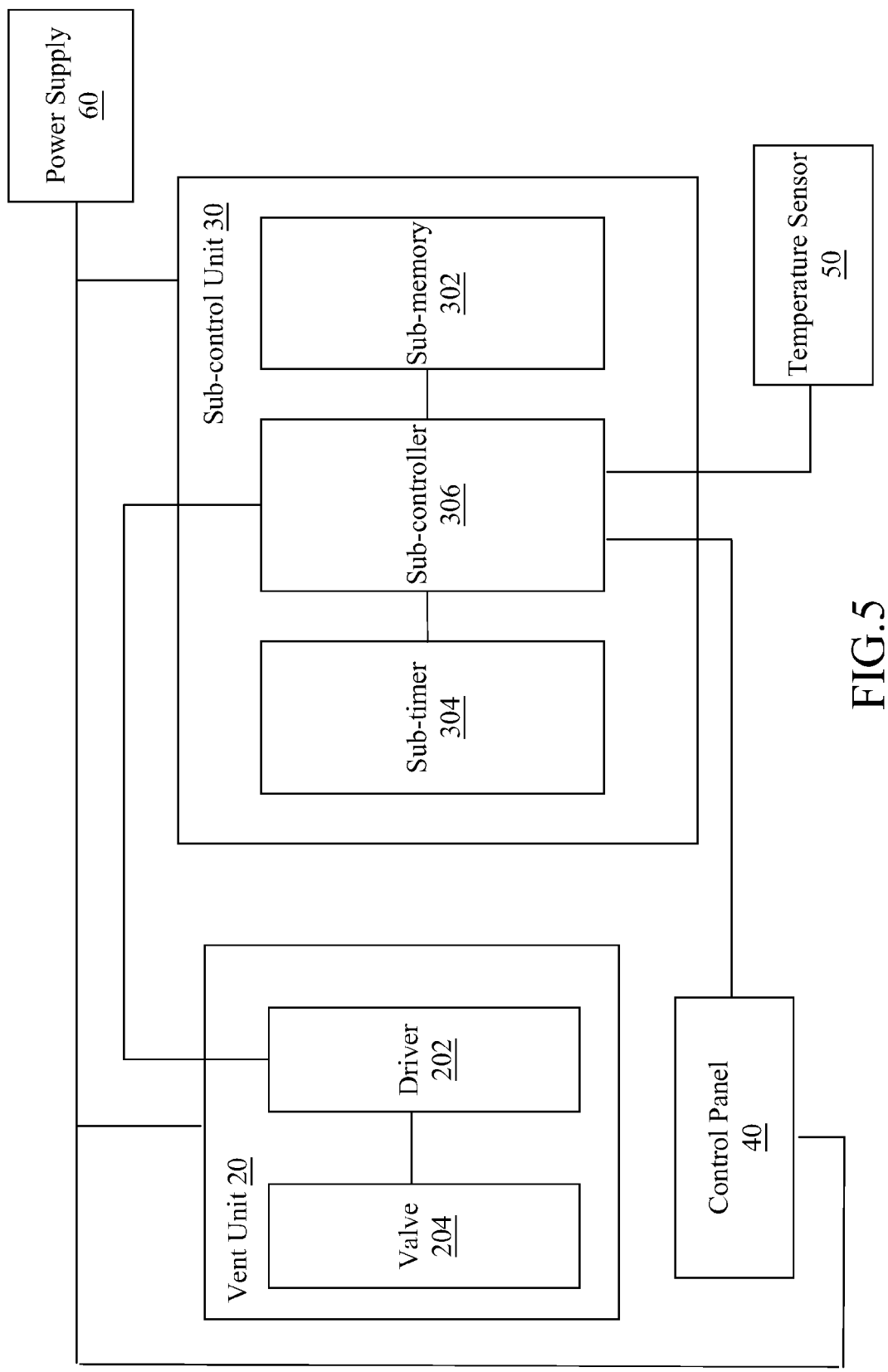
FIG. 5 illustrates a block diagram of a system according to a fourth embodiment of the present invention.
Figure 6A:
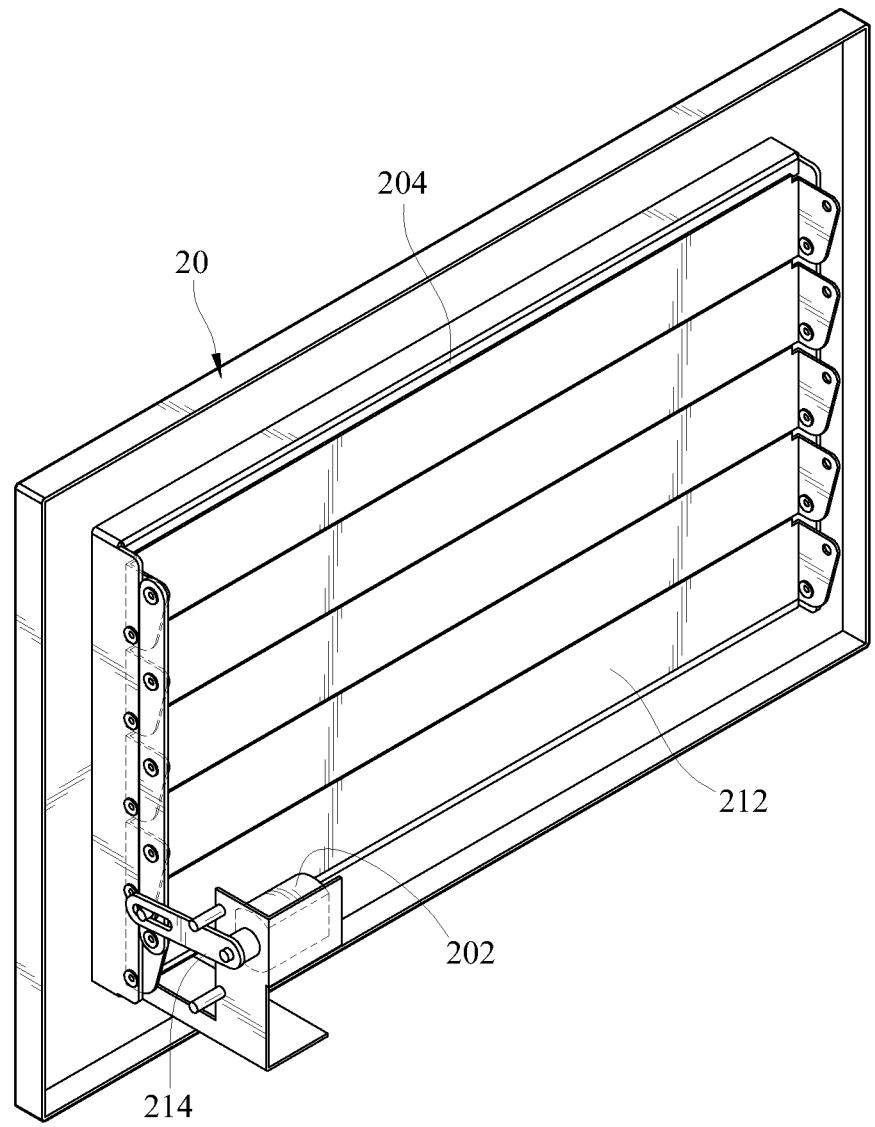
FIGS. 6A, 6B, 6C, 6D and 6E illustrate schematic views of vent unit according to the first embodiment of the present invention.
Figure 6B:
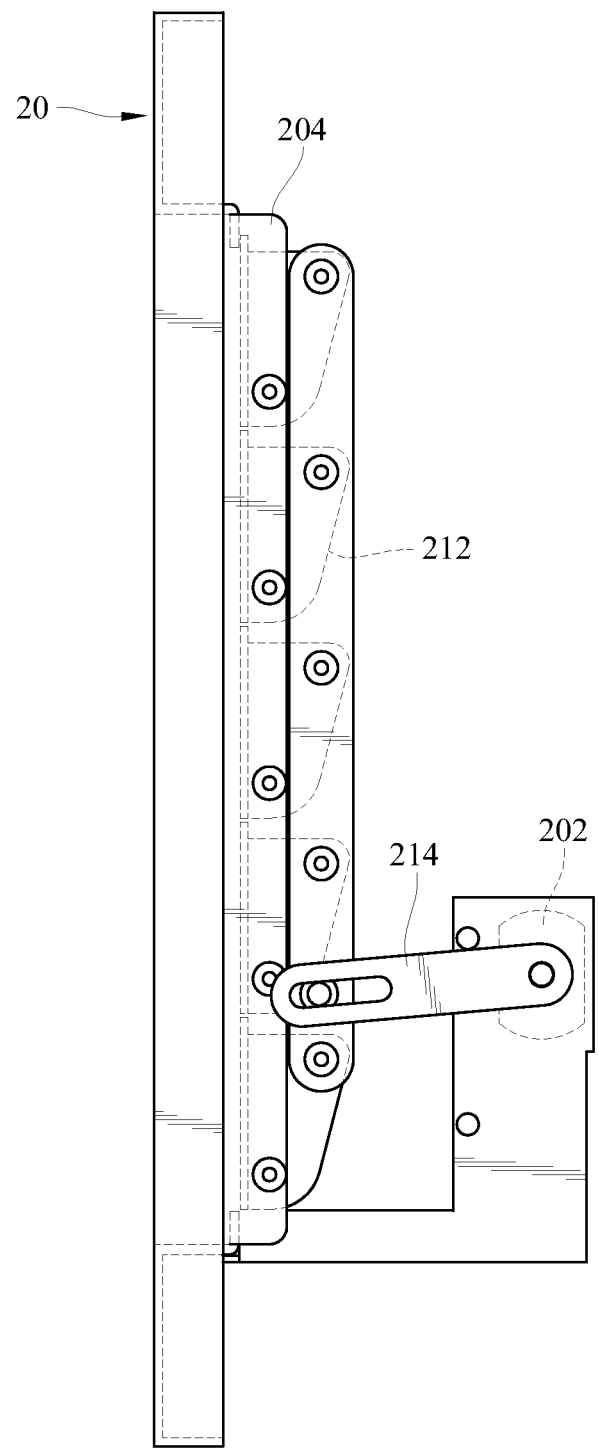
Figure 6C:
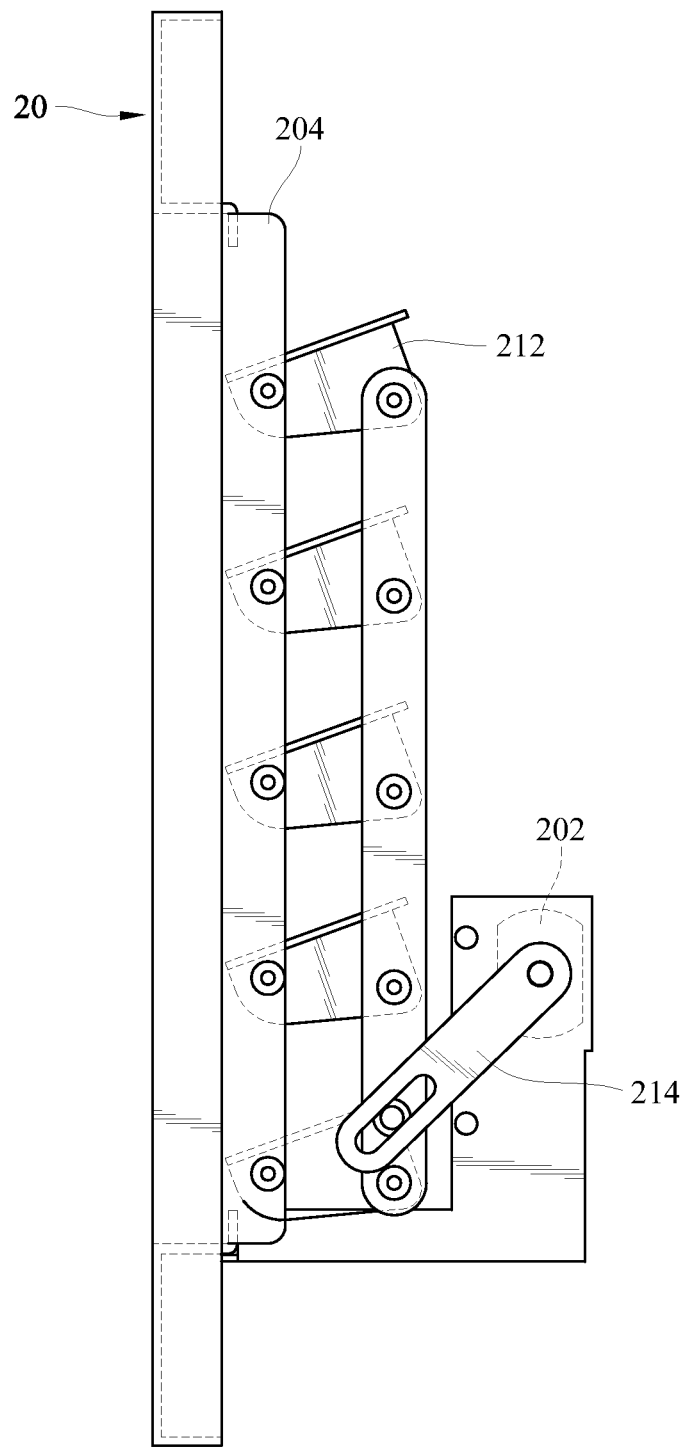
Figure 6D:
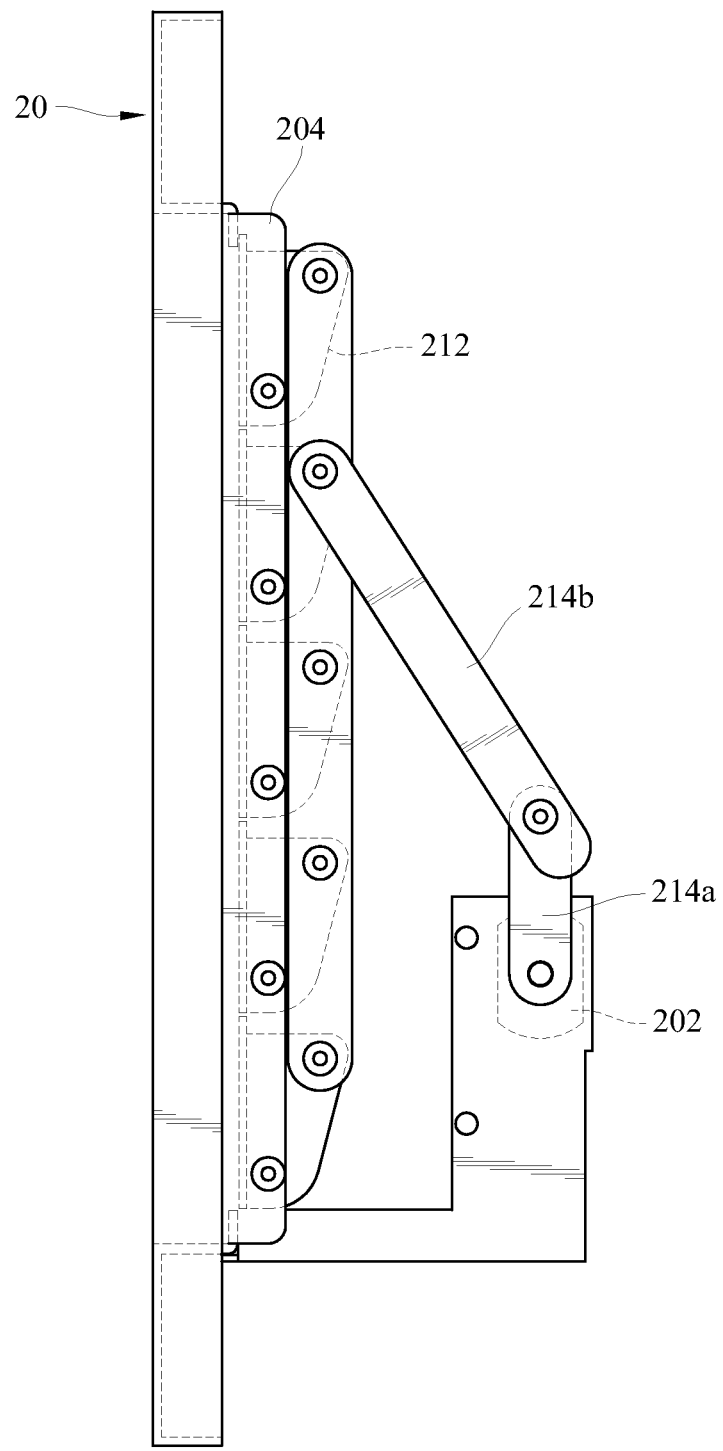
Figure 6E:
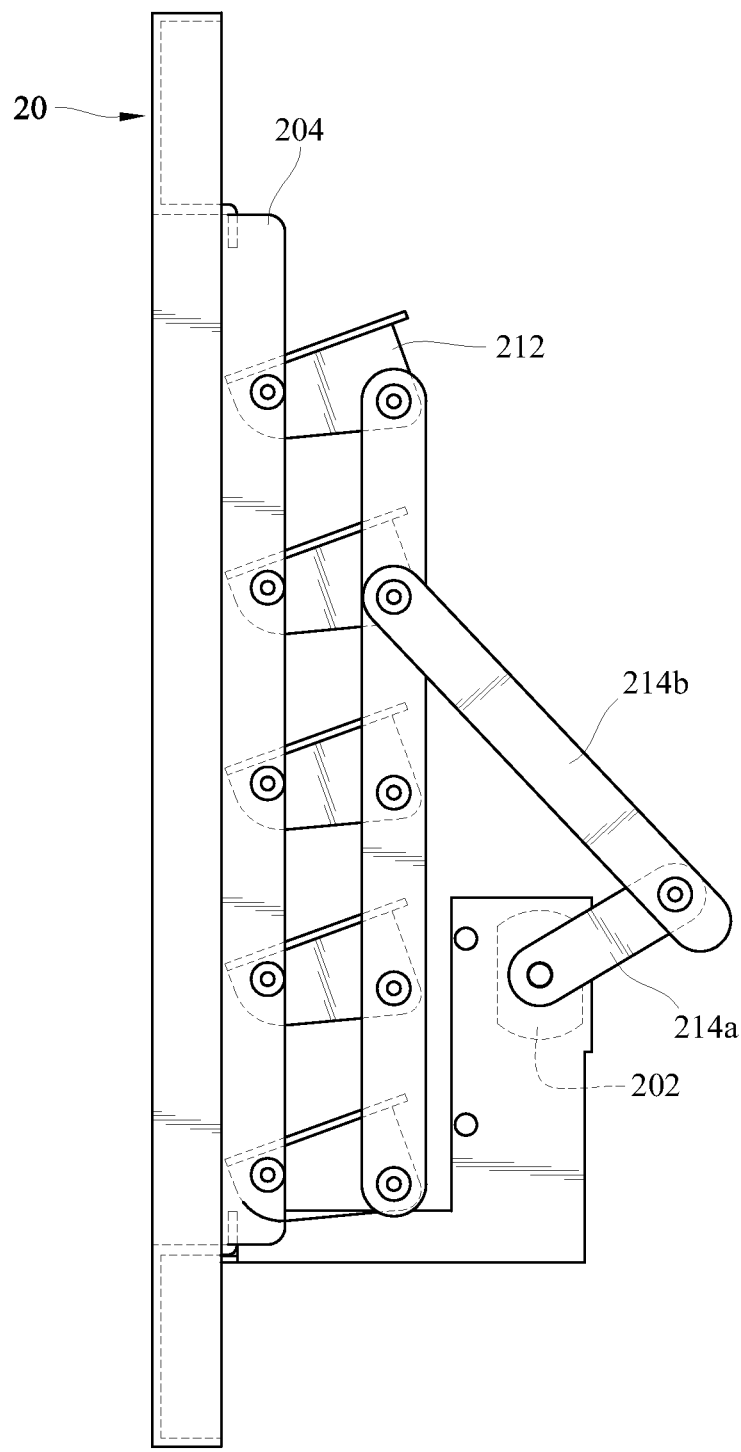

Referring to FIG. 5, in a fourth embodiment of the present invention, the auxiliary control device comprises a power supply element 60. The power supply element 60 outputs a power to the vent unit 20, the sub-control unit 30 and the control panel 40.

In the single embodiment or in some embodiments, the vent unit 20, the sub-control unit 30 and the control panel 40 share the same power supply element.

In the single embodiment or in some embodiments, the vent unit 20, the sub-control unit 30 and the control panel 40 can also be supplied by different power supply element.

In the single embodiment or in some embodiments, the vent unit 20 and the sub-control unit 30 may share the same power supply element and the control panel 40 may be supplied by a different power supply element. At least two power supply elements 60 is need. One is for the sub control unit 30 and the other is for the control panel 40.

Generally, the vent unit 20, the sub-control unit 30 and control panel 40 use direct current source. Therefore, the power supply is advantageously a direct current voltage source. The power supply element 60 may be a dry battery or a rechargeable battery. In the single embodiment or in some embodiments, the power supply element 60 may obtain electric energy from outside environment. For example, light energy is converted into electric energy, a temperature difference is converted into electric energy, or mechanical energy generated by rotating fan is converted into electric energy. In the single embodiment or in some embodiments, the power supply element 60 may charge the rechargeable battery with the energy obtained from outside environment. In the single embodiment or in some embodiments, the power supply element 60 maybe obtain power alternating current voltage source. In the single embodiment or in some embodiments, the alternating current voltage source is converted into a direct current voltage source through the transformers. The direct current power source is then output to the vent unit 20 and the sub-control unit 30. The power supply element 60 and the vent unit 20 and the sub-control unit 30 are connected by using a lead.

FIG. 6A-6E illustrates schematic structural views of a vent unit according to a first embodiment of the present invention. As can be seen from the FIGS. 6B and 6C, the valve 204 on the vent unit 20 comprises a plurality of blades 212. The driver 202 actuates the blades 212 to rotate by a connecting rod 214, so as to adjust the opening size. In the another embodiment, referring to FIGS. 6D and 6E, the driver 202 actuates the blades 212 to rotate by a first connecting rod 214a and a second connecting rod 214b, so as to adjust the opening size. When the blades 212 are actuated, besides that the vent opening size is changed, a function of guiding an air flow direction is further provided. Of course, in order to achieve better air-guiding effect, an air-guiding element may be further added to the valve 204.

Figure 7A:
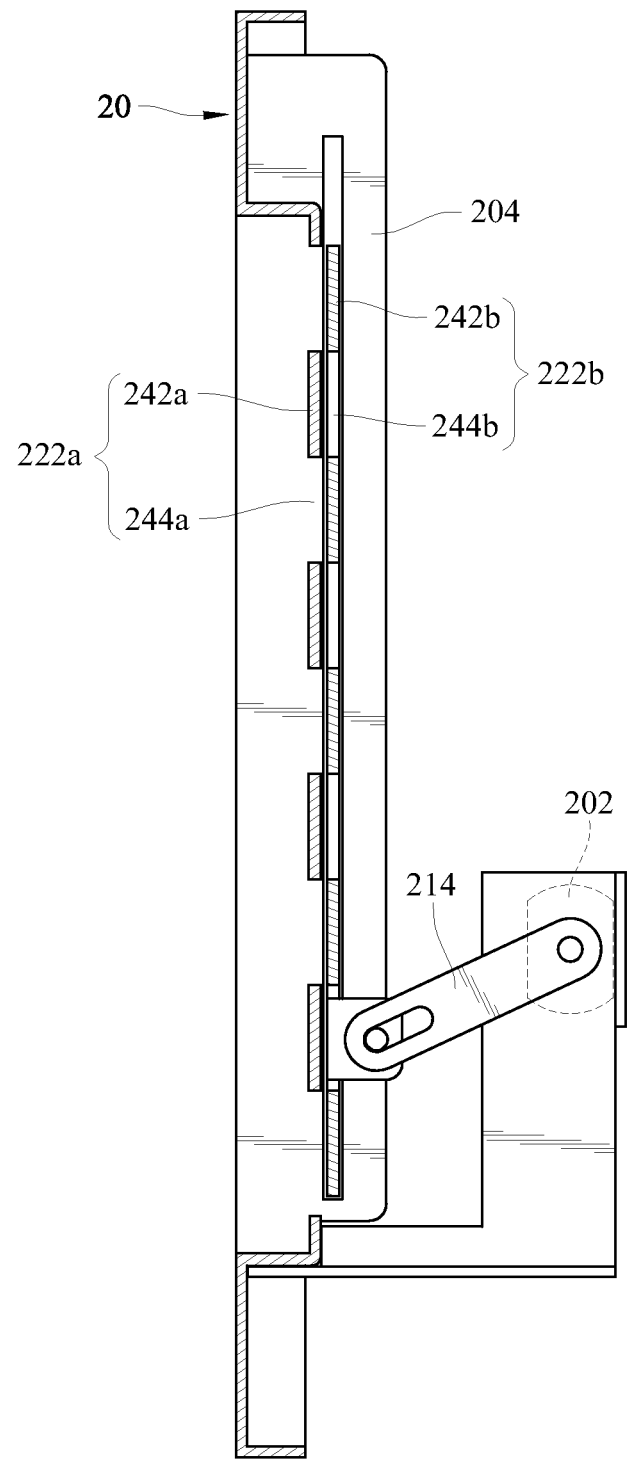
FIGS. 7A and 7B illustrate a schematic view of a vent unit according to the second embodiment of the present invention.
Figure 7B:
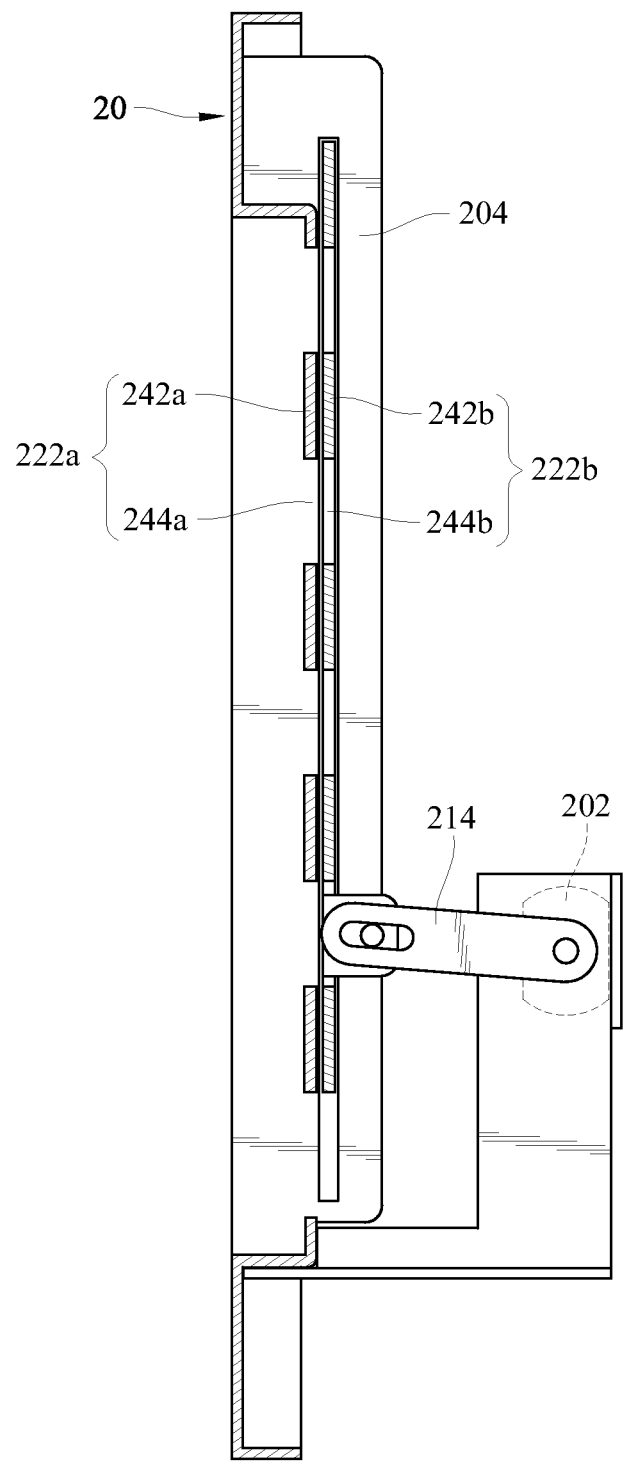

FIGS. 7A and 7B illustrate schematic structural views of a vent unit according to a second embodiment of the present invention. The valve 204 of the vent unit 20 comprises a first blade 222a and a second blade 222b. The first blade 222a is fixed on the vent unit 20. The second blade 222b may be movable at a direction. The driver 202 actuates the second blade 224 to be shifted, so as to adjust the opening size.

Furthermore, the first blade 222a has a vent part 242a and a windshield part 244a. The second blade 222b also has a vent part 242b and a windshield part 244b. When the vent part 242a of the first blade 222a overlaps the windshield part 244b of the second blade 222b completely, the opening size of the valve 204 is smallest at this time. In this embodiment, the smallest opening size may totally prevent the air flow from ventilating. When the vent part 242a of the first blade 222a overlaps the vent part 242b of the second blade 222b completely, the opening size of the valve 204 at this time is biggest.

Figure 8A:
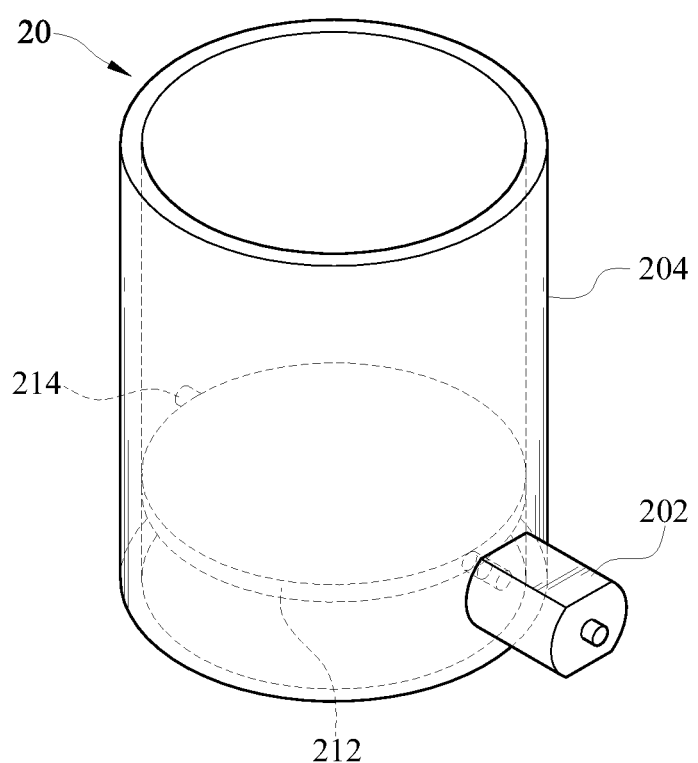
FIGS. 8A, 8B, 8C and 8D illustrate a schematic view of a vent unit according to the third embodiment of the present invention.
Figure 8B:
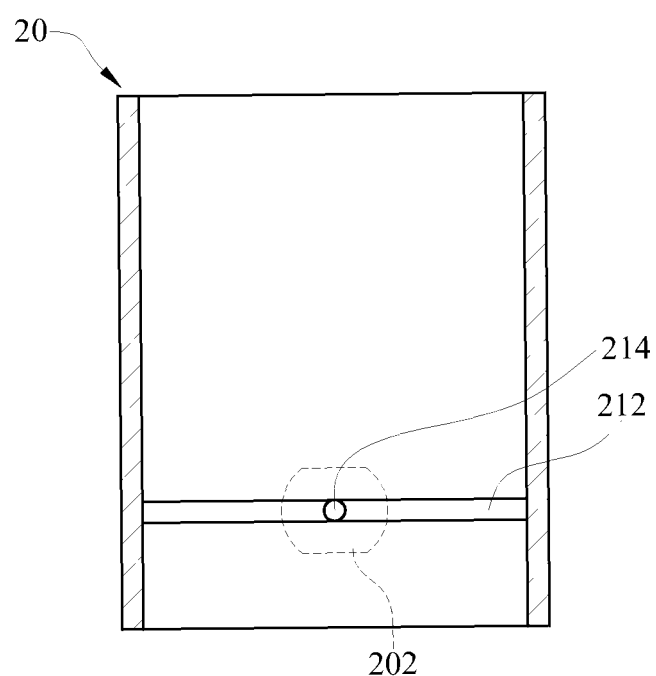
Figure 8C:
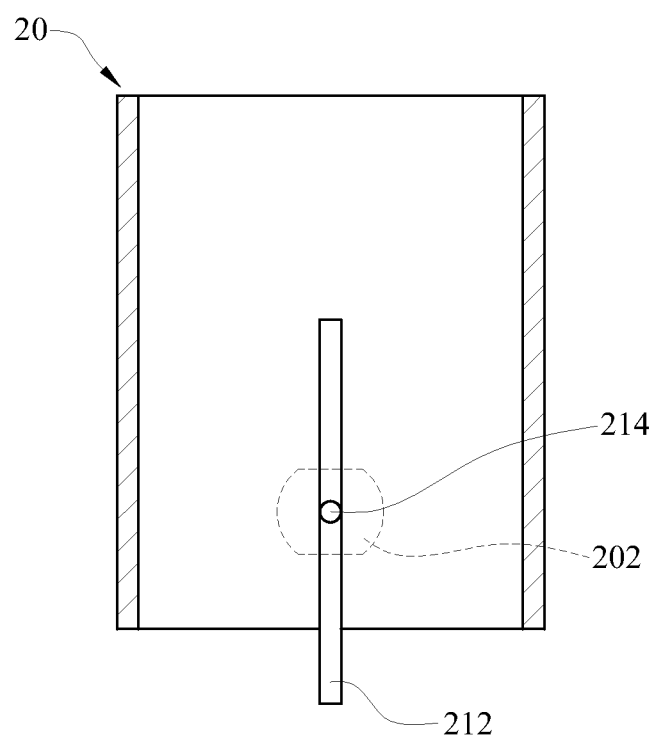

FIG. 8A-8C illustrates schematic structural views of a vent unit according to a first embodiment of the present invention. As can be seen from the FIGS. 8A, the valve 204 on the vent unit 20 comprises one blade 212. The driver 202 actuates the blade 212 to rotate around a connecting rod 214, so as to adjust the opening size. FIG. 8B illustrates the valve 204 is closed with the blade 212 cover the opening of the valve 204. FIG. 8C illustrates the valve 204 with large opening.

Figure 8D:
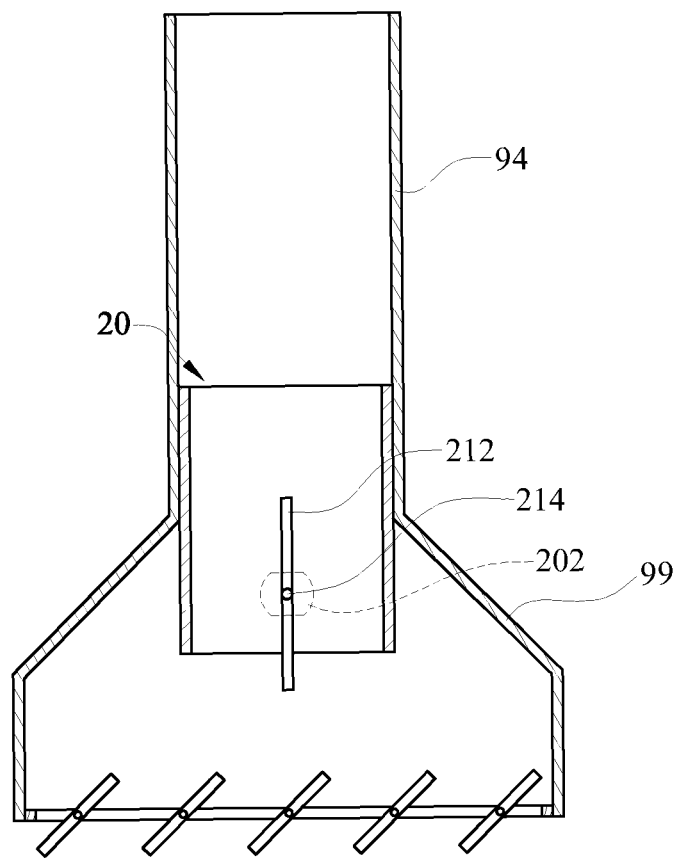

FIG. 8D illustrates schematic structural views of a vent unit disposed in the duct. In the single embodiment or in some embodiments, the vent unit 20 can be put at the terminal of the duct 94 and in the cavity 99 of the outlet or inlet Three possible schematic structure views of the vent unit illustrate in FIGS. 6A, 7A and 8A but may not be intended to limit the scope of various embodiments of the vent unit. There are other structures to accept control signals to adjust the opening size of the valve 204. One of ordinary skill in the art may easily achieve the same or similar objectives through different structures.

According to an embodiment of the present invention, the vent unit 20 further comprises a filter screen. The filter screen is disposed corresponding to the vent, so as to filter the air passing through the vent. The filter screen may be an electrostatic filter screen or an activated carbon filter screen, or other screens that may filter impurities in the air.

Figure 9:
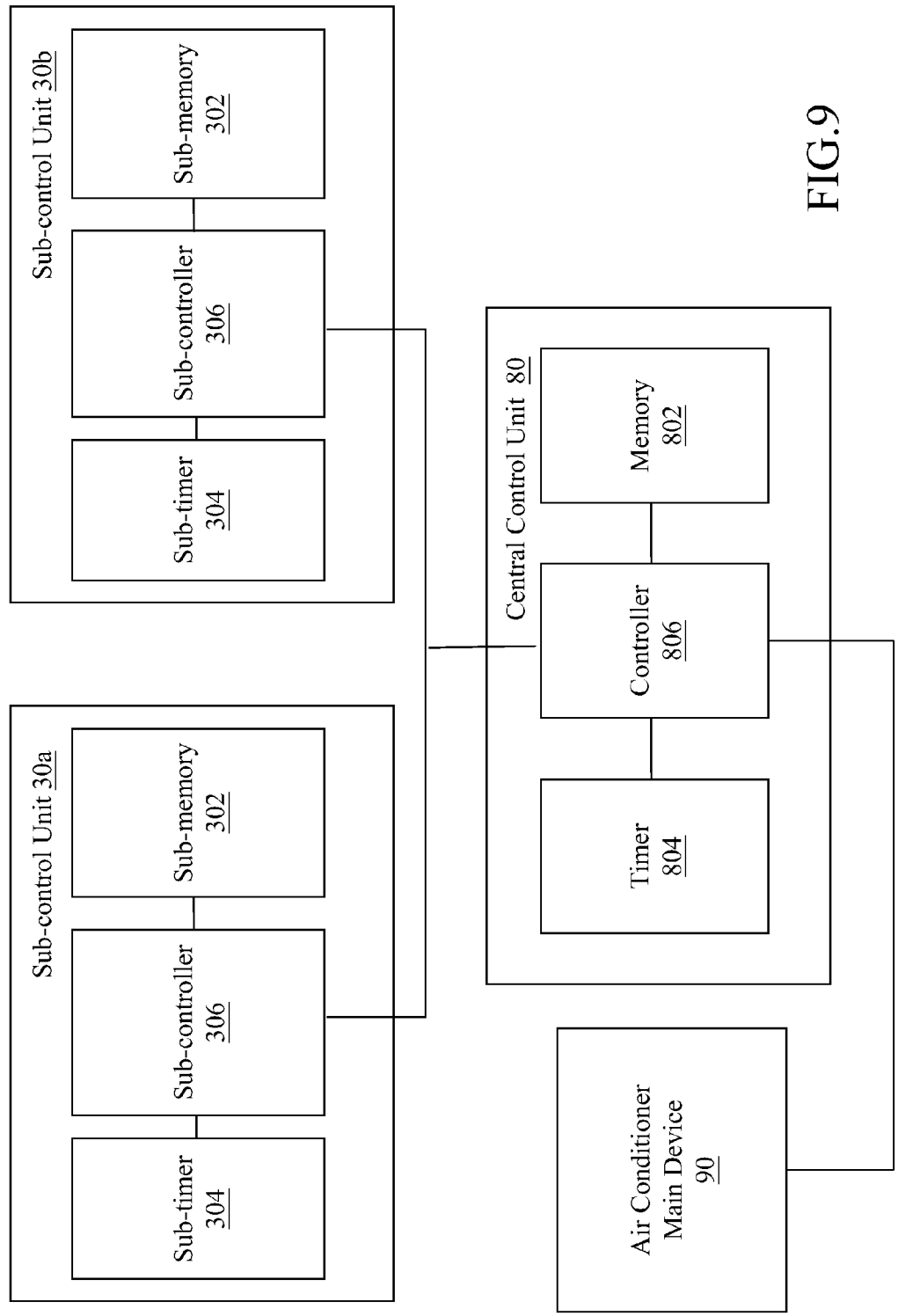
FIG. 9 illustrates another connection relation diagram of a system according to a fifth embodiment of the present invention.

Referring to FIG. 9, in a fifth embodiment of the present invention, the auxiliary control device comprises a main control unit 80, a first sub-control unit 30a, and a second sub-control unit 30b. The main control unit 80 is coupled to the first sub-control unit 30a and the second sub-control unit 30b. The coupling means between them may be a wired connection, or may also be a wireless connection. In the fifth embodiment, one main control unit 80 corresponds to two sub-control units 30a, 30b. However, the present invention is not limited thereto. When the present invention is practically implemented, one main control unit 80 may also correspond to one or a plurality of sub-control units 30a, 30b.

The main control unit 80 comprises a main memory 802, a main timer 804, and a main controller 806. The main controller 806 collects control time tables from the sub-controllers 306a, 306b through a coupling connecting between the main control unit 80 and the sub-control units 30a, 30b. Next, the main controller 806 integrates the control time tables of the first sub-control unit 30a and the second sub-control unit 30b into one general time table, and stores the general time table in the main memory 802. The general time table comprises a plurality of time slots and a plurality of opening sizes of respective vents corresponding to the time slots. In the single embodiment or in some embodiments, the general time table comprises a plurality of time slots and a plurality of temperature set values corresponding to the time slots.

The main controller 806 may collect the control time tables of the sub-control units 306a, 306b in the following methods. In the single embodiment or in some embodiments, the first sub-control unit 30a and the second sub-control unit 30b may transfer their control time tables to the main controller 806 periodically (a regular or irregular time interval). In the single embodiment or in some embodiments, only when a user modifies the control time table of the first sub-control unit 30a or the second sub-control unit 30b, the first sub-control unit 30a or the second sub-control unit 30b may transmits the modified control time table to the main controller 806. In the single embodiment or in some embodiments, the control time tables of the sub-control unit may be transmitted to the main controller 806 after the main controller 806 inquires the time table of the sub-control unit.

The main timer 804 is used for generating alternate time information. The time information of the main timer 804 may synchronize with a sub-timer 302a of the first sub-control unit 30a or a sub-timer 302b of the second sub-control unit 30b. Still, a slight error in time is tolerable.

After the control time tables of respective sub-control units 30a, 30b are collected and integrated, the main controller 806 calculates the optimum air flow amount or air flow temperature according to the time information generated by the main timer 804 and the general control time table. The main controller 806 outputs a control signal to the main machine 90 according to the air flow amount or the air flow temperature. At this time, the main machine 90 may outputs the corresponding air flow amount or air flow temperature according to the control signal. Further, according to an exemplary embodiment, an intelligent control mechanism can be utilized by the main controller 806. The main controller 806 calculates the optimum air flow amount or air flow temperature according to both the control time tables from sub-control units 30a, 30b and current temperatures in rooms. For example, the following control time tables which corresponds to Rooms A, B, C and D are collected by the main controller 806. Each of sub-controller units 30a, 30b additionally transmits current room temperature to the main controller 806. Each of control time tables includes opening size set by users in each room. At time period of 08:00-10:00, Rooms A and B are opened and Rooms C and D are closed. Accordingly, the main controller 806 takes current temperatures from Rooms A and B into consideration and calculates optimum air flow amount and air flow temperature. From 10:00 to 12:00, only Room A is opened and Rooms B, C and D are closed. The main controller 806 only considers current temperature from Rooms A. Further, from 22:00 to 08:00, all the Rooms A, B, C and D are opened. Therefore, the main controller 806 takes the temperature from Rooms A, B, C and D.

| Time | ROOM A | ROOM B | ROOM C | ROOM D |
| --- | --- | --- | --- | --- |
| 08:00-10:00 | Open | Open | Close | Close |
| 10:00-12:00 | Close | Open | Close | Close |
| 12:00-16:00 | Close | Open | Open | Close |
| 16:00-22:00 | Open | Open | Close | Close |
| 22:00-08:00 | Open | Open | Open | Open |

The operation mode depicted above is a scheduled mode. In order to provide a more convenient and smarter function of the auxiliary control device, the present invention discloses another embodiment having a compulsory mode. According to the embodiment of the present invention, the sub-memory 302 of auxiliary control device further comprises a mode flag. The mode flag is selectively set to be the scheduled mode and a compulsory mode by the control panel 40. The sub-control unit 30 controls the driver to adjust the opening size according to the control time table and the time information when the mode flag is the scheduled mode. The sub-control unit 30 controls the driver to adjust the opening size according to input signals from the control panel 40 when the mode flag is the compulsory mode.

Figure 10:
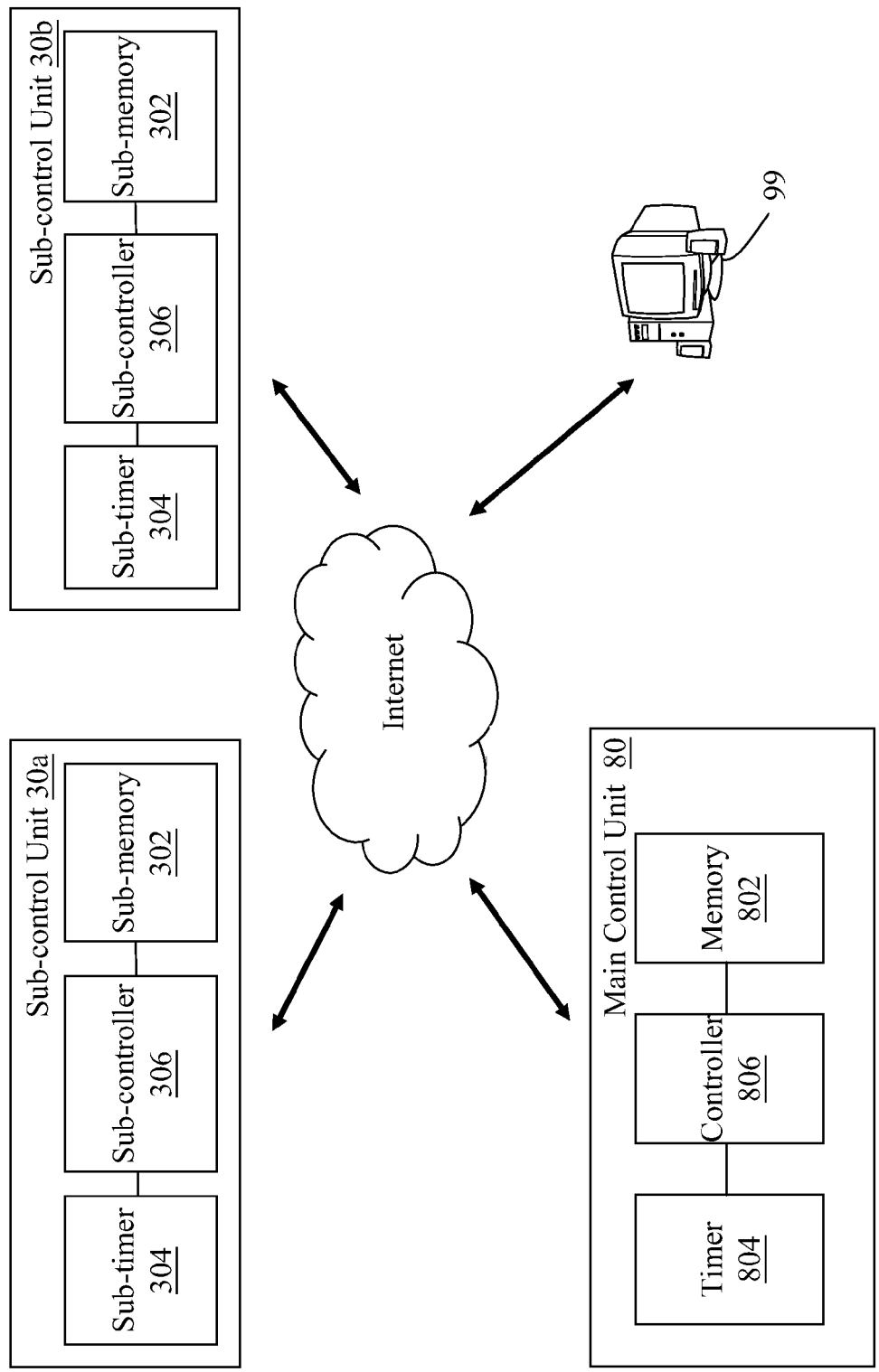
FIG. 10 illustrates another connection relation diagram of a system according to a fifth embodiment of the present invention.

FIG. 10 illustrates another connection relation diagram of a system according to a fifth embodiment of the present invention. The cloud computing device 99 couples to the main controller 806 and the sub-controller 306. Specifically, the cloud computing device 99, the main controller 806 and sub-controller 306 are connected via Internet.

The cloud computing device 99 collects the control time table from the sub-memory 302 with the sub-controller 306, and integrates the control time table into a general time table. The main controller 806 receives and stores the general time table in the main memory 802 and generates a control signal to the main machine according to the other time information and the general time table.

In view of the above, an air conditioning system utilizing the auxiliary control device may control a vent opening size of each vent automatically. In addition, the main machine may changes its general ventilation amount according to the vent opening size of the vent, increase an energy use efficiency of the air conditioning system, thereby achieving a function of energy saving. Also, due to that the auxiliary control device and other devices may be connected in a manner of wireless communication, the complexity of installment may be reduced, thus saving the cost of installment.

What is claimed is:

1. An auxiliary control device, adapted to an air conditioning system comprising a main machine and at least one vent, the auxiliary control device comprising:
    a vent unit, comprising:
        a valve, correspondingly disposed on the vent; and
        a driver, for actuating the valve to adjust an opening size of the vent through the valve;
    a sub-control unit, comprising:
        a sub-memory, for storing a control time table, wherein the control time table comprises a plurality of time slots, and a plurality of temperature setting values corresponding to the time slots;
        a sub-timer, for generating a time information; and
        a sub-controller, for controlling the driver to adjust the opening size according to the control time table and the time information; and
    a temperature sensor, for sensing a room temperature, wherein the sub-controller looks up the temperature setting value corresponding to the time information in the control time table with the time information and adjusts the opening size according to the temperature setting value and the sensing temperature.

2. The auxiliary control device according to claim 1, further comprising a control panel coupled to the sub-controller, wherein the control panel is used for a user to input the control time table, and the sub-controller stores the input control time table in the sub-memory.

3. The auxiliary control device according to claim 2, wherein the control panel is coupled to the sub-controller through a wireless means.

4. The auxiliary control device according to claim 1, wherein the valve comprises at least one blade, and the driver actuates the at least one blade to rotate to adjust the opening size.

5. The auxiliary control device according to claim 1, wherein the valve comprises at least one blade, and the driver actuates the at least one blade to be shifted to adjust the opening size.

6. The auxiliary control device according to claim 1, further comprising a power supply element, for supplying a power to the control unit.

7. The auxiliary control device according to claim 6, wherein the power supply element further obtains an electric energy from outside environment.

8. The auxiliary control device according to claim 1, further comprising a main control unit, wherein the main control unit comprises:
    a main memory;
    a main timer, for outputting another time information; and
    a main controller, coupled to the sub-controller to collect the control time table of the sub-memory with the sub-controller, for integrating the control time table into a general time table, storing the general time table in the main memory, and generating a control signal to the main machine according to the other time information and the general time table.

9. An auxiliary control device, adapted to an air conditioning system comprising a main machine and at least one vent, the auxiliary control device comprising:

a vent unit, comprising:
   a valve, correspondingly disposed on the vent; and
   a driver, for actuating the valve to adjust an opening size of the vent through the valve;
a sub-control unit, comprising:
   a sub-memory, for storing a control time table, wherein the sub-memory comprises a mode flag;
   a sub-timer, for generating a time information; and
   a sub-controller, for controlling the driver to adjust the opening size according to the control time table and the time information; and
a control panel, coupled to the sub-controller, wherein the control panel is used for a user to input the control time table, the sub-controller stores the input control time table in the sub-memory, the mode flag is selectively set to be a scheduled mode and a compulsory mode by the control panel, the sub-control unit controls the driver to adjust the opening size according to the control time table and the time information when the mode flag indicates the scheduled mode, and the sub-control unit controls the driver to adjust the opening size according to input signals from the control panel when the mode flag indicates the compulsory mode.

10. The auxiliary control device according to claim 9, wherein the control panel is coupled to the sub-controller through a wireless means.

11. The auxiliary control device according to claim 9, further comprising a power supply element, for supplying a power to the control unit.

12. The auxiliary control device according to claim 11, wherein the power supply element further obtains an electric energy from outside environment.

13. The auxiliary control device according to claim 9, further comprising a main control unit, wherein the main control unit comprises:
   a main memory;
   a main timer, for outputting another time information; and
   a main controller, coupled to the sub-controller to collect the control time table of the sub-memory with the sub-controller, for integrating the control time table into a general time table, storing the general time table in the main memory, and generating a control signal to the main machine according to the other time information and the general time table.

* * * * *